United States Patent
Aur Der Heide et al.

(10) Patent No.: US 7,997,045 B2
(45) Date of Patent: Aug. 16, 2011

(54) DEVICE FOR FILLING PACKING WRAPPERS WITH STUFFING

(75) Inventors: Christian Aur Der Heide, Osnabrueck (DE); Dirk Aur Der Heide, Alfhausen (DE); Jürg-Heinrich Kallweit, Osnabrueck (DE)

(73) Assignee: Kalle GmbH, Wiesbaden (DE)

( * ) Notice: Subject to any disclaimer, the term of this patent is extended or adjusted under 35 U.S.C. 154(b) by 471 days.

(21) Appl. No.: 11/886,601

(22) PCT Filed: Mar. 11, 2006

(86) PCT No.: PCT/EP2006/002261
§ 371 (c)(1),
(2), (4) Date: Dec. 10, 2008

(87) PCT Pub. No.: WO2006/099956
PCT Pub. Date: Sep. 28, 2006

(65) Prior Publication Data
US 2009/0211711 A1 Aug. 27, 2009

(30) Foreign Application Priority Data
Mar. 19, 2005 (DE) .......................... 10 2005 012 780

(51) Int. Cl.
*A22C 13/02* (2006.01)
*A22C 11/02* (2006.01)
*B65B 51/04* (2006.01)
*B65B 57/00* (2006.01)

(52) U.S. Cl. ............... 53/55; 53/138.4; 53/567; 53/576; 53/168; 452/22; 452/31; 452/32; 452/34; 452/48

(58) Field of Classification Search ............. 53/55, 138.1–138.4, 567, 576, 53/168; 452/21, 22, 24, 29–36, 45–48; *A22C 13/02*
See application file for complete search history.

(56) References Cited

U.S. PATENT DOCUMENTS

| | | | | | |
|---|---|---|---|---|---|
| 4,306,334 | A | * | 12/1981 | Niedecker | 452/34 |
| 4,434,527 | A | * | 3/1984 | Staudenrausch et al. | 452/34 |
| 4,547,931 | A | | 10/1985 | Staudenrausch et al. | |
| 4,583,264 | A | * | 4/1986 | Nausedas | 452/34 |
| 4,649,601 | A | * | 3/1987 | Kollross | 452/22 |

(Continued)

FOREIGN PATENT DOCUMENTS

DE   30 19 981 C2   12/1981
(Continued)

*Primary Examiner* — Stephen F Gerrity
(74) *Attorney, Agent, or Firm* — ProPat, L.L.C.

(57) ABSTRACT

A packing wrapper filling device includes a filling machine (1) having at least one pivotable filling tube (11) on rotary plate (10). A gathered packing wrapper (14) is fitted onto the filling tube. The invention includes a closing mechanism (2) and store (3) for gathered packing wrappers. The closing mechanism (2) closes both sides of filled wrapper sections. Control device (22) interconnects filling machine (1), closing mechanism (2), store (3), and rocking arms (16). The lateral wall(s) of store (3) include a longitudinal flap (16) in the lower section, pivotable by rotary articulation (20) via rocking arms (15). The control device (22) controls individual envelope (14) removal from store (3). Transport devices (5, 6, 7, and 8) and deflection rollers (9) arranged along feed belt (4) transport envelope (14) along the feed belt (4) from store (3) to filling tube (11 or 12).

11 Claims, 4 Drawing Sheets

U.S. PATENT DOCUMENTS

| | | | |
|---|---|---|---|
| 4,847,951 A | 7/1989 | Kollross | |
| 4,914,784 A * | 4/1990 | Nausedas | 452/34 |
| 5,092,814 A * | 3/1992 | Kasai et al. | 452/47 |
| 5,297,983 A * | 3/1994 | Mueller et al. | 452/33 |
| 6,139,416 A * | 10/2000 | Topfer | 452/31 |
| 2004/0038635 A1* | 2/2004 | Sawhill et al. | 452/40 |

FOREIGN PATENT DOCUMENTS

| | | |
|---|---|---|
| EP | 0 379 993 A2 | 8/1990 |
| EP | 0 391 490 B1 | 10/1990 |
| EP | 0 455 050 A1 | 11/1991 |
| EP | 42 23 128 A1 | 1/1993 |
| EP | 0 962 143 B | 12/1999 |

* cited by examiner

DEVICE FOR FILLING PACKING WRAPPERS WITH STUFFING

CROSS-REFERENCE TO RELATED APPLICATIONS

This application is being filed under Rule 1.371 as a National Stage Application of pending International Application No. PCT/EP2006/002261 filed Mar. 11, 2006, which claims priority to the following parent application: German Patent Application No. 10 2005 012 780.0, filed Mar. 19, 2005. Both International Application No. PCT/EP2006/002261 and German Patent Application No. 10 2005 012 780.0 are hereby incorporated by reference herein in their entirety.

FIELD OF THE INVENTION

The invention relates to an apparatus for filling packaging casings with a stuffing and subsequently closing the packaging casings section by section, having a filling machine which, on a rotary plate, has at least one pivotable filling tube onto which can be drawn a packaging casing which has been shirred to form a strand, having a closing device for closing the filled packaging casing section by section, and having a magazine in which shirred packaging casings are stored.

BACKGROUND OF THE INVENTION

It has long been known to fill pasty stuffing, such as sausage meat or cheese, into tubular packaging casings. For filling and closing the packaging casings, use is made of filling machines which interact with a closing device. Such filling machines and closing devices are known. The filling machines usually have a rotary plate or turret plate which is pivotable and on which are arranged one, two or more filling tubes, of which one filling tube is pivoted into a position in which a packaging casing is drawn onto the filling tube such that the end of the packaging casing is located upstream of the mouth of the filling tube. The tubular packaging casings are generally dimensionally stable strands of long length of from 10 to 200 m, which are folded up to form strands of a length of from 10 to 100 cm. In the vicinity of the mouth of the filling tube, the latter is enclosed by an external brake which counteracts the action of the packaging casing being drawn off from the filling tube during the filling operation by an adjustable force being used to press the packaging casing onto the lateral surface of the filling tube.

EP 0 962 143 B1 discloses an apparatus for producing filled packaging casings, in particular sausages, by filling and subsequently closing tubular or bag-like sausage casings. The apparatus comprises a filling machine which has at least one filling tube with a mouth onto which sausage casings are drawn and through which stuffing can be directed in order to fill the sausage casings. A closing machine for closing filled sausage casings or sausage-casing sections is arranged downstream of the mouth of the filling tube, as seen in relation to the stream of stuffing in the filling tube. The apparatus further comprises a residual-casing remover for removing from the filling and/or the closing machine that part of a sausage casing which has not been filled. Also provided are a magazine for non-filled sausage casings and means for removing a non-filled sausage casing from the magazine in order for the casing to be drawn onto the filling tube. Provided between the filling machine and the closing machine is a data line or signal line for receiving operating parameters. The known apparatus is also distinguished by a monitoring device which can detect at least one parameter of a pack produced, such as the weight or the plumpness thereof, and by at least one control device, which is connected to the monitoring device and the filling and/or the closing machine and is configured such that, in the event of one or more of the parameters detected by the monitoring device deviating from corresponding desired values, it changes one or more operating parameters of the filling and/or closing machine or switches the latter off.

The storage apparatuses have magazines and also an apparatus for discharging sausage casings, means for accommodating a sausage casing at the transfer position, means for removing the sausage casing from the magazine and means for discharging the sausage casing to a discharge position. The discharging apparatus comprises a gripper which can be displaced longitudinally in a direction running parallel to the accommodating holders for the non-filled sausage casings and, in addition, can be pivoted transversely to this direction. Furthermore, a separately activatable drive is provided for opening and closing the gripper, for displacing the latter longitudinally and for pivoting the same. The three drives of the gripper are arranged such that the drive for pivoting the gripper carries along the other two drives, and that the drive for displacing the gripper longitudinally carries along the drive for opening and closing the gripper.

DE 30 19 981 C2 relates to an apparatus for storing sausage casings on a sausage-filling machine, having a storage container for accommodating a plurality of layers of sausage casings which have been folded up in the manner of an accordion in their longitudinal direction, having dispensing means for dispensing a sausage casing, and having drawing-on means for automatically drawing a sausage casing onto a stuffing tube for a plastically deformable substance such as sausage meat or cheese. Conveying means are provided for slowly advancing the lowermost layer of sausage casings, transversely to the length thereof, over a distance along the base of the storage container, this distance corresponding to a multiple of the diameter of the sausage casings, in the direction of a removal location. Also provided are return means for returning further sausage casings which rest on the lowermost layer.

The base of the storage container slopes up in relation to the horizontal, in the conveying direction of the conveyor, by an angle of inclination which is at least equal to an angle of repose which allows the top sausage casing to roll back automatically. Arranged between the base of the storage container and the removal location is a downwardly inclined guide well, of which the bottom part forms a sliding guide for pushing the lowermost sausage casing onto the stuffing tube. The conveying means have a uniformly circulating endless conveying loop with drivers guided above the storage-container base.

The known magazine apparatuses operate reliably in the case of dimensionally stable packaging casings made of plastic, although this is only achieved by way of high technical outlay, for example three drives for a gripper apparatus for the packaging casing. In the case of a known apparatus, the magazine is adjustable and can be oriented precisely in relation to an adjacent filling tube of the filling machine. The high technical outlay means that malfunctioning can easily occur and, in the case of the apparatus being converted to different diameters and lengths of packaging casing, for example the operating parameters of the drives for the gripper apparatus then have to be changed, which is correspondingly time-consuming.

The invention takes the apparatus described in the introduction as its departure point and has the object, in an apparatus comprising a filling machine, closing device and magazine for filling packaging casings fully automatically, of simplifying, and thus configuring in an operationally reliable manner, the magazine and the transporting system from the magazine to the filling machine.

SUMMARY OF ADVANTAGEOUS EMBODIMENTS OF THE INVENTION

This object is achieved such that a control device controls the removal of an individual strand from the magazine as and when required, and that transporting devices, deflecting rollers and a feed path are provided for transporting the strand from the magazine to the filling-machine filling tube located in a receiving position.

In one configuration of the invention, the magazine is of hopper-like configuration with conically tapering side walls, and the side walls open out into an elongate gap-like outlet opening. The outlet opening is expediently dimensioned such that only a single strand can pass through the outlet opening. In addition to the two conically tapering side walls, the magazine has two parallel walls, namely a rear wall and a front wall, which have a triangular contour.

In a further development of the invention, one or both side walls of the magazine has/have a respective longitudinal shutter, and the latter are articulated in a pivotable manner on the side walls and form the shut-off part of the side walls. The rotary articulation of the longitudinal shutter is oriented in the longitudinal direction of the side wall, in which case the longitudinal shutter can be pivoted in the interior of the hopper-like magazine. For this purpose, in each case one tilting lever is arranged outside the magazine, in the vicinity of the longitudinal shutter, and, in its tilting position, pivots the longitudinal shutter into the interior of the magazine. Each tilting lever is expediently connected to a control device and receives, from the latter, a control signal for pivoting the longitudinal shutter as soon as a sensor detects the end of the strand which has been drawn onto a filling tube.

The individual strand passes out of the outlet opening under the influence of gravitational force and passes into a feed path which runs between the outlet opening of the magazine and the free end of that filling tube which is located in its receiving position, in which a strand is drawn onto the filling tube.

The other configuration of the invention can be gathered from the features of patent claims 9 to 14.

BRIEF DESCRIPTION OF THE FIGURES

The invention will be explained in more detail hereinbelow with reference to an exemplary embodiment illustrated in the drawings, in which.

DETAILED DESCRIPTION OF ADVANTAGEOUS EMBODIMENTS OF THE INVENTION

Figure 1:
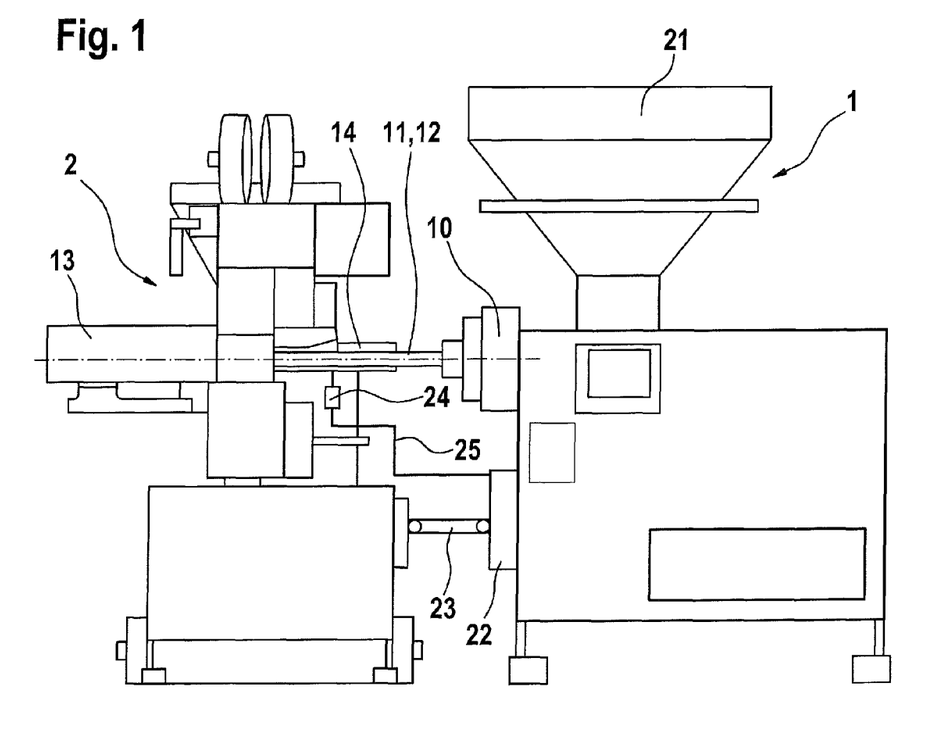
FIG. 1 shows a schematic side view of the apparatus according to the invention.

FIG. 1 illustrates schematically, in a side view, a known filling machine 1 and a known closing device 2, which interact for filling packaging casings with a stuffing, in particular for filling sausage casings with sausage meat, and for finishing off the filled casings. The stuffing is contained in a filling hopper 21 of the filling machine 1 and is fed under pressure, by means of a filling pump, to a filling tube 11 or 12 located in a filling position. The filling machine 1 has a rotary plate 10, which is a turret plate which is provided with at least one filling tube, in particular with two filling tubes 11, 12 and can be pivoted about an axis of rotation and secured in predetermined positions. It is also possible for more than two filling tubes to be arranged on the rotary plate 10.

A packaging casing which has been shirred to form a strand 14 has been drawn onto the filling tube 12. The filling tube 12 assumes the filling position, in which it is connected to the outlet of the filling pump (not illustrated), which forces the stuffing out of the filling hopper 21 and through the filling tube 12 into the packaging casing. The packaging casings have lengths of from 10 to 200 m and above and are folded up in the manner of an accordion to form dimensionally stable strands 14 of from 10 to 100 cm in length and are pushed onto the filling tube. The packaging casings are inherently stable, dimensionally stable strands which are preferably net packaged, but may also be in relatively short lengths even without net packaging. The net packaging is expediently punctured by the filling-tube opening. It is likewise possible to use shirred articles with an opening on one side, for example a ring.

An external casing brake (not shown) secures the packaging casing in a known manner by way of an adjustable force during the filling operation and counteracts the action of the packaging casing being drawn off from the filling tube as a result of the filling pressure. During the filling operation, further folded parts of the strand 14 are constantly being drawn off by way of the filling tube, straightened and filled with stuffing. As soon as a section of the packaging casing has been sufficiently filled with stuffing, this section is closed by the closing device 2, which is located upstream of the filling opening of the filling tube. The closing device constricts one end of the filled section in a known manner and then closes this end by attaching two (closure) clips located one beside the other. The constriction between the two closure clips is severed. The filled packaging-casing section closed on both sides, in the case of a sausage casing the sausage closed on both sides, is separated off from the rest of the packaging casing and transported away from the closing device 2 by a transporting device 13.

The operations of filling and closing the next strand of the packaging casing can then begin. As soon as a packaging casing has been largely filled, and the individual sections have been divided up, a sensor 24 detects the end of the packaging casing and transmits a corresponding signal, via a signal line 25, to a control device 22 which, on the one hand, directs a signal to a device for removing the end section of the packaging casing and, on the other hand, pivots the rotary plate 10 into a new position, in which case a fresh packaging casing, which has been drawn onto the further filling tube, is moved into its filling position. The control device 22 connects the closing device 2 to the filling machine 1 via a data line 23, and is also connected to a magazine 3 (see FIG. 2), in which strands 14 are stored.

Once the end section of the largely filled packaging casing has been removed from the filling tube, the latter passes, as a result of the pivoting movement of the rotary plate 10, into a receiving position, in which a fresh, non-filled packaging casing is drawn onto the filling tube.

A number of filling machines and closing devices are known, and described, in the prior art, and interact in a largely automated manner.

Figure 2:
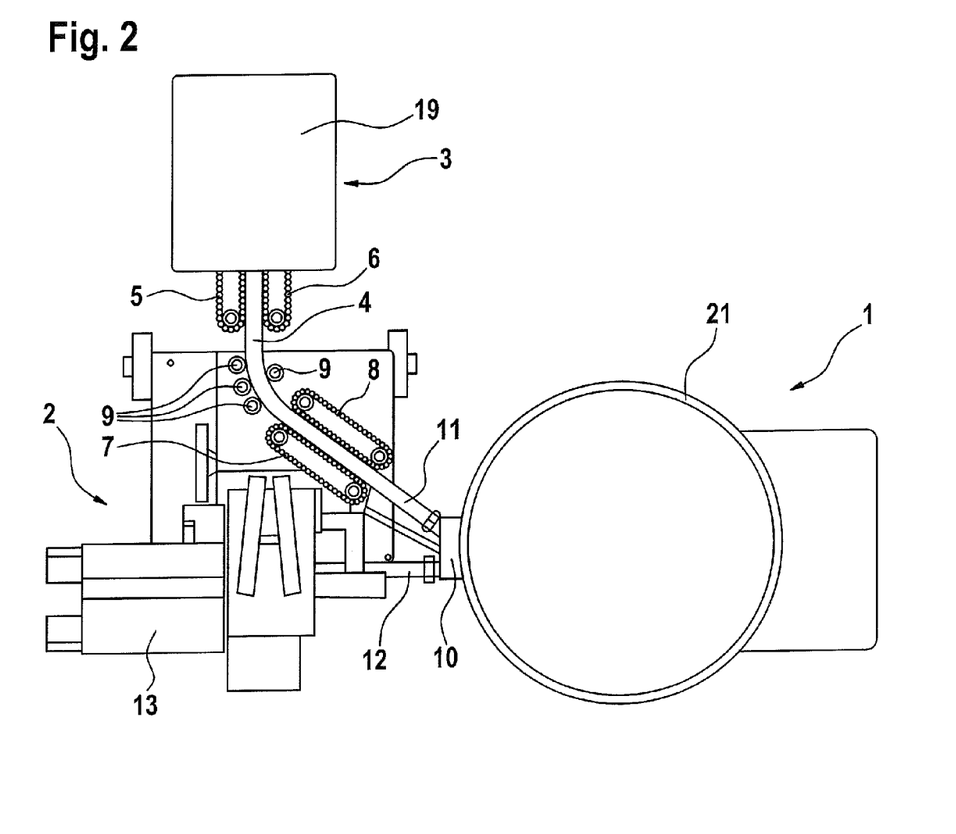
FIG. 2 shows a schematic plan view of the apparatus according to the invention.

FIG. 2 shows, in plan view, the magazine 3, the filling machine 1 with the filling hopper 21, the closing device 2 and transporting devices 5, 6, 7, 8, deflecting rollers 9 and a feed path 4 for transporting the strands 14 from the magazine 3 to the filling tube 11 of the filling machine 1, the filling tube being located in a receiving position.

As has already been mentioned, a first filling tube 12 of the filling machine 1 has been fitted with a strand 14 which is arrested on the filling-tube tip, i.e. the filling opening of the filling tube. For this purpose, the first part of the strand 14 has been guided through displacement and clipping shears, and the closing device has attached a first closure clip. In particular shirred articles which have already been closed on one side by so-called first clips are suitable here for fully automatic operation. Thereafter, the filling machine is ready to begin the filling operation. The individual filled sections, or sausages, are monitored for filling diameter and filling weight and, as required, the corresponding parameters are readjusted. In the receiving position, a fresh strand 14 is pushed onto the second filling tube 11. To provide better clarity, the filled strand on the filling tube 12 and the strand 14 drawn onto the filling tube 11 have not been illustrated in FIG. 2. The filling tube located in the receiving position is fitted fully automatically with a strand from the magazine 3. The magazine 3 is filled with the necessary number of strands 14 at the beginning of a production shift. It is possible here for the strands 14 to be used for different products, i.e. the individual strands may differ from one another in terms of both length and diameter. Each strand is provided with a first (closure) clip and the filling tubes are provided with an external brake, which is activated once the strand 14 has been drawn onto the filling tube. The filling operation can be carried out immediately. The automatic filling-diameter measurement, which is carried out by optical means, is regulated by desired values specified for the external brake.

The feed path 4 runs between an outlet opening 17 (see FIGS. 3 and 4) of the magazine 3 and the free end of that filling tube 11 or 12 which is located in its receiving position, in which a strand 14 is drawn onto the filling tube. The free end of the filling tube is to be understood as the end which has the filling opening. The feed path 4 is expediently an open tube section or a channel, and, for reasons relating to space, is curved in arcuate fashion in order to provide as compact a construction as possible. The channel has a cross section which, unlike the tube cross section, is not circular. The transporting devices for the strand 14 comprise circulating first and second transporting belts 5 and 6 which are arranged on both sides of the outlet opening 17 of the magazine 3 and at the start of the feed path 4. The endlessly circulating first and second transporting belts 5 and 6 are in contact with the strand located in the feed path 4 and convey the same in the direction of the filling tube 11. Deflecting rollers 9 are fitted on both sides of the feed path 4 in the region of the arcuate curvature of the feed path 4 and ensure that the strand 14 is reliably deflected in the region of the arcuate curvature of the feed path 4. Also provided are endlessly circulating third and fourth transporting belts 8 and 9, which are arranged on both sides of the feed path 4 upstream of the free end of the filling tube 11. The third and fourth transporting belts push the strand onto the filling tube 11.

Figure 3:
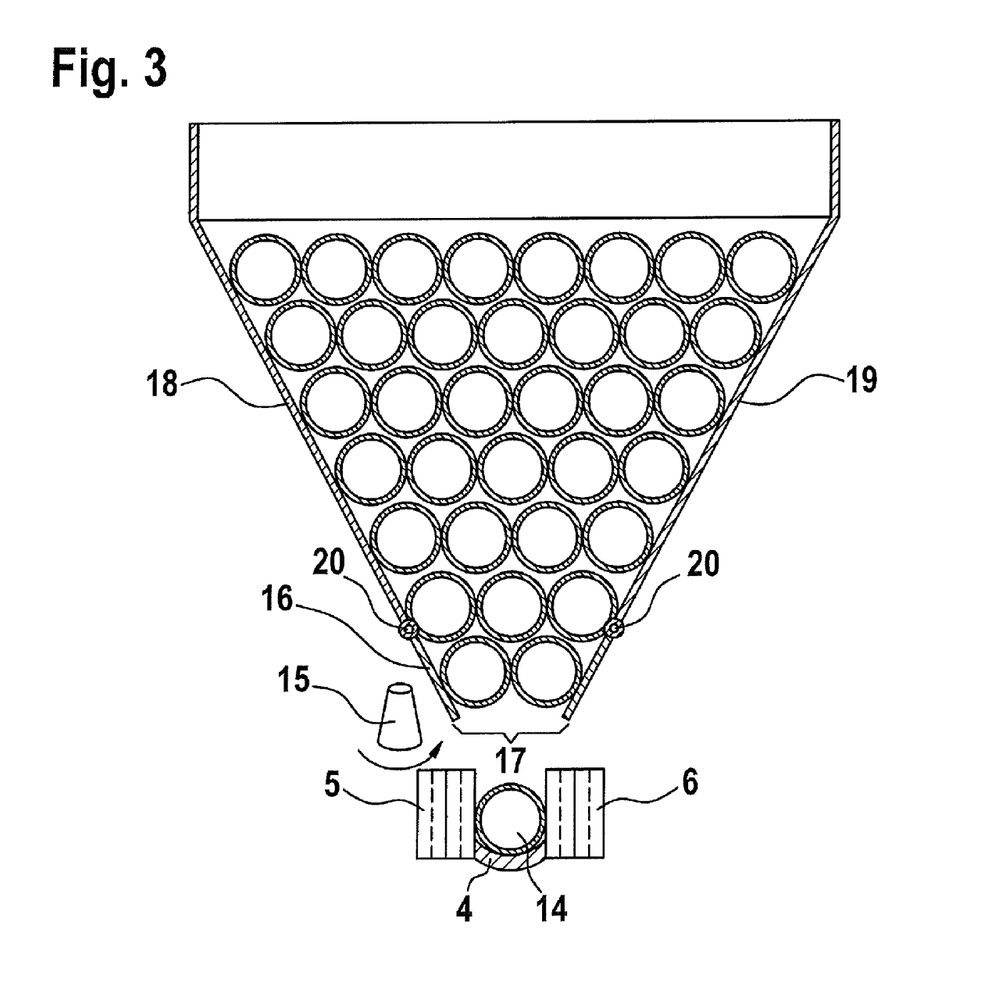
FIG. 3 shows a schematic sectional view through a magazine filled with shirred packaging casings, the longitudinal shutter of the apparatus being closed.
Figure 4:
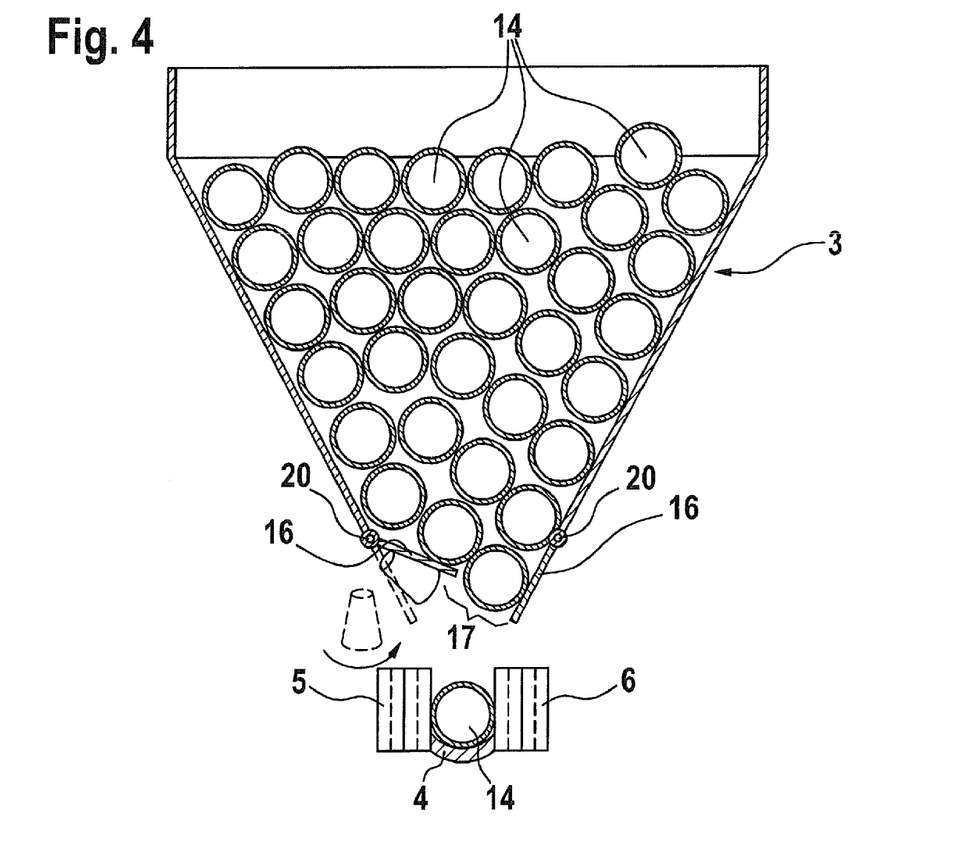
FIG. 4 shows a schematic sectional view of the magazine according to FIG. 3 with the longitudinal shutter pivoted inward.

FIGS. 3 and 4 show schematic sectional views of the magazine 3, which is of hopper-like configuration. The magazine 3 is bounded by two conically tapering side walls 18, 19 which open out in an elongate gap-like outlet opening 17. The side walls 18, 19 are rectangular and are connected to rear and front walls (not illustrated). The front wall and rear wall are each triangular. An adjustable intermediate wall may be provided within the magazine, and this can partition off a certain storage space in the magazine in order to take account of different lengths of strand 14. The magazine 3 is largely filled with strands 14 which are stacked one above the other parallel to the outlet opening 17. The outlet opening 17 is dimensioned such that only a single strand 14 can pass through the outlet opening 17. When the automated individual-strand feed is at a standstill, the two lowermost strands 14 block one another under the influence of gravitational force, as can be seen from FIG. 3, in which case, in this state, it is not possible for a strand 14 to pass through the outlet opening 17. A longitudinal shutter 16 is fitted in the one side wall 18 of the magazine 3, this longitudinal shutter being articulated in a pivotable manner on the side wall 18 and forming the shut-off part of the side wall 18.

Figure 4A:
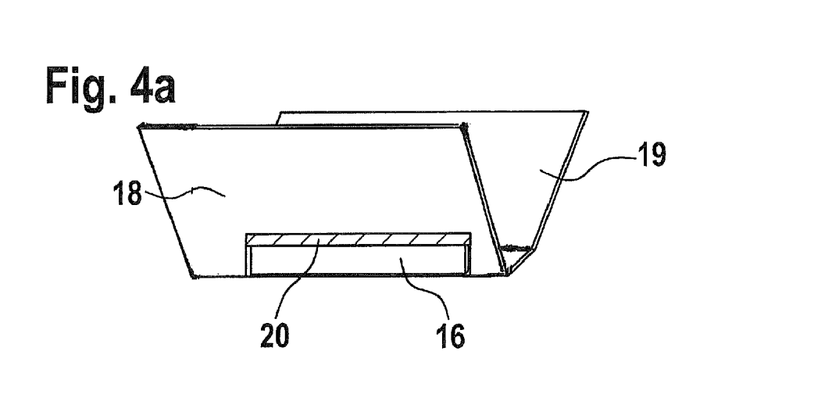
FIG. 4a shows a perspective side view, in detail form, of the longitudinal shutter in one of the side walls of the magazine.

A rotary articulation 20 is provided for this purpose, and the longitudinal shutter 16 can be pivoted about this rotary articulation into the interior of the magazine 3, as is shown in FIG. 4. The longitudinal or blocking shutters 16 regulate the action of the strands 14 passing out through the outlet opening. The arrangement of the longitudinal shutter 16 in the side wall 18 is illustrated in detail form in FIG. 4a. As is shown in FIG. 4a, the longitudinal shutter 16 can extend just over part of the length of the side wall 18, but it is likewise possible for the longitudinal shutter 16 to extend over the entire length of the side wall 18. FIG. 3 also illustrates a strand 14 in the feed path 4, this strand being transported in the direction of the filling machine 1 by means of the first and second transporting belt 5, 6.

As can be seen from FIG. 4, a tilting lever 15 is located outside the magazine 3, in the vicinity of the longitudinal shutter 16. As soon as it receives a corresponding control signal from the control device 22, the tilting lever 15 is pivoted in the direction of the arrow, toward the longitudinal shutter 16, and pushes the latter into the interior of the magazine 3. The strand 14 butting against the side wall 18 is thus raised by the longitudinal shutter, in which case the neighboring lowermost strands no longer block one another and the strand 14 butting against the inside of the side wall 19 can pass through the outlet opening 17 and thus passes into the feed path 4, in order to be transported there in the direction of the filling machine 1 with the aid of the endlessly circulating transporting belts 5 and 6. Of course, it is also possible for a longitudinal shutter to be fitted in a pivotable manner on the other side wall 19 and, correspondingly, for a tilting lever 15 to be provided in the vicinity of this longitudinal shutter. It is likewise possible for each of the two side walls 18 and 19 to be provided with such a longitudinal shutter 16 and for a corresponding tilting lever 15 to be arranged in the vicinity of the longitudinal shutters on both sides in each case. FIGS. 3 and 4 show in each case just the tilting lever 15 in the vicinity of the side wall 18 and, to provide better clarity, just the rotary articulation 20 in the side wall 19 but not the tilting lever next to it.

The width of the outlet opening 17 can be adjusted to the diameters of the strands 14 by frame-like inserts which butt against the insides of the side walls 18, 19 in the vicinity of the outlet opening 17.

The magazine with one or two longitudinal shutters in one or two side walls and with one or two tilting levers is not particularly complex in mechanical terms and operates largely without any malfunctioning over long periods of time.

The control device 22, which is connected both to the filling machine 1 and to the closing device 2, supplies all the control signals and/or signals for setting the parameters in the individual structural units of the filling apparatus. These include control signals in respect of drawing a strand 14 onto the filling tube 11 or 12, in respect of pivoting the filling tube 11 or 12 into a filling position, in respect of filling the strand 14, and in respect of pivoting the filling tube with the filled strand section into a removal position. The control unit also supplies a signal for pivoting the rotary plate 10, in which case a further filling tube passes into a position in which a strand can be drawn on, and also supplies signals in respect of closing the filled strand 14 section by section using (closure) clips, and in respect of releasing a strand 14 from the magazine 3 by virtue of the tilting lever or the tilting lever 15 being pivoted in order to pivot the longitudinal shutters 16 into the interior of the magazine 3. If the magazine 3 does not contain any more strands 14, then the filling machine and the closing device are brought to a standstill by a contact switch (not shown) in the magazine 3. It is only once the magazine 3 has been filled up with strands 14 that the filling machine and the closing device are switched on again. The filling pump of the filling machine 1 is switched off as soon as the strand 14 which has been drawn onto the filling tube is filled and the end section of the strand 14 has to be removed from the filling tube. As soon as a filling tube with a freshly drawn-on strand 14 has been pivoted into the filling position, the filling pump is started up again.

The invention claimed is:

1. An apparatus for filling packaging casings with a stuffing and subsequently closing the packaging casings section-by-section comprising
    a filling machine which, on a rotary plate, has at least one pivotable filling tube onto which can be drawn a packaging casing which has been shirred to form a strand,
    a closing device for closing the filled packaging casing section-by-section,
    and a magazine in which shined packaging casings are stored as individual strands,
    wherein a control device controls the removal of an individual strand from the magazine as and when required,
    and transporting devices, deflecting rollers and a feed path are provided for transporting the strand from the magazine to the filling-machine filling tube located in a receiving position,
    wherein the magazine comprises a hopper-like configuration with conically tapering side walls, and the side walls open out into an elongate gap-like outlet opening,
    the feed path runs between the outlet opening of the magazine and the free end of that filling tube which is located in its receiving position, in which a strand is drawn onto the filling tube,
    the feed path is an open tube section or a channel and
    the feed path is curved in arcuate fashion.

2. The apparatus as claimed in claim 1, wherein the outlet opening is dimensioned such that only a single strand can pass through the outlet opening.

3. The apparatus as claimed in claim 1, wherein at least one side wall of the magazine has a respective longitudinal shutter, and said shutter is articulated in a pivotable manner on the side wall and forms the shut-off part of the side wall.

4. The apparatus as claimed in claim 3, wherein one tilting lever is arranged outside the magazine, in the vicinity of the longitudinal shutter, and said tilting lever pivots the longitudinal shutter into the interior of the magazine when in a tilting position.

5. The apparatus as claimed in claim 4, wherein the tilting lever is connected to a control device and receives, from the control device, a control signal for pivoting the longitudinal shutter as soon as a sensor detects the end of the strand which has been drawn onto a filling tube.

6. The apparatus as claimed in claim 5, wherein the control device is connected both to the filling machine and to the closing device and transmits, to the filling machine, the closing device and tilting lever, control signals in respect of drawing a strand onto the pivotable filling tube, in respect of pivoting the filling tube into its filling position, in respect of filling the strand by way of the filling tube, in respect of transporting the filled sections of the strand away from the filling tube, in respect of closing the filled strand section-by-section and in respect of releasing a strand from the magazine.

7. The apparatus as claimed in claims 3, wherein a tilting lever is arranged outside the magazine, in the vicinity of at least one side wall and said tilting lever pivots the longitudinal shutter into the interior of the magazine when in a tilting position.

8. The apparatus as claimed in claim 1, wherein the transporting devices comprise endlessly circulating first and second transporting belts which are arranged on both sides of an outlet opening of the magazine at the start of the feed path and are in contact with a strand located in the feed path in order to convey said strand in the direction of the filling tube.

9. The apparatus as claimed in claim 1, wherein deflecting rollers are fitted on both sides of the feed path in the region of the arcuated curvature of the feed path.

10. The apparatus as claimed in claim 1, wherein the transporting devices comprise endlessly circulating third and fourth transporting belts which are arranged on both sides of the feed path upstream of the free end of the filling tube.

11. An apparatus for filling packaging casings with a stuffing and subsequently closing the packaging casings section-by-section comprising
    a filling machine which, on a rotary plate, has at least one pivotable filling tube onto which can be drawn a packaging casing which has been shirred to form a strand,
    a closing device for closing the filled packaging casing section-by-section,
    and a magazine in which shirred packaging casings are stored,
    wherein a control device controls the removal of an individual strand from the magazine as and when required,
    and transporting devices, deflecting rollers and a feed path are provided for transporting the strand from the magazine to the filling-machine filling tube located in a receiving position,
    and the feed path is curved in arcuate fashion.

* * * * *

UNITED STATES PATENT AND TRADEMARK OFFICE
CERTIFICATE OF CORRECTION

PATENT NO. : 7,997,045 B2  
APPLICATION NO. : 11/886601  
DATED : August 16, 2011  
INVENTOR(S) : Auf Der Heide et al.

Page 1 of 1

It is certified that error appears in the above-identified patent and that said Letters Patent is hereby corrected as shown below:

Title page:  
Item (12)  
Line 2, delete "Aur Der Heide et al." insert --Auf Der Heide et al.--

Item (75), Inventors  
Line 1, delete "Christian Aur Der Heide" insert --Christian Auf Der Heide--  
Line 2, delete "Dirk Aur Der Heide" insert --Dirk Auf Der Heide--

Column 7  
Claim 1, Line 34, delete "shined" insert --shirred--

Signed and Sealed this  
Fourth Day of October, 2011

David J. Kappos  
*Director of the United States Patent and Trademark Office*